(12) United States Patent
Gwoo et al.

(10) Patent No.: US 11,401,201 B2
(45) Date of Patent: Aug. 2, 2022

(54) ENAMEL COMPOSITION, METHOD FOR PREPARING ENAMEL COMPOSITION, AND COOKING APPLIANCE

(71) Applicant: LG ELECTRONICS INC., Seoul (KR)

(72) Inventors: Dong Gun Gwoo, Seoul (KR); Jingon Kim, Seoul (KR); Young Seok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/796,066

(22) Filed: Feb. 20, 2020

(65) Prior Publication Data

US 2020/0270170 A1    Aug. 27, 2020

(30) Foreign Application Priority Data

Feb. 22, 2019  (KR) .................. 10-2019-0021142

(51) Int. Cl.
*C03C 8/08*   (2006.01)
*C03C 8/06*   (2006.01)
(Continued)

(52) U.S. Cl.
CPC .................. *C03C 8/08* (2013.01); *C03C 8/06* (2013.01); *C03C 8/16* (2013.01); *C03C 8/20* (2013.01);
(Continued)

(58) Field of Classification Search
CPC .... C03C 8/08; C03C 8/06; C03C 8/16; C03C 8/20; C03C 2204/04; C03C 2207/04; C23D 5/02; C23D 5/04; F24C 15/005
See application file for complete search history.

(56) References Cited

U.S. PATENT DOCUMENTS 3,547,098 A   12/1970  Lee
3,580,733 A   5/1971   Ott
(Continued)

FOREIGN PATENT DOCUMENTS

AU   2370367   1/1969
BG   98027     3/1994
(Continued)

OTHER PUBLICATIONS

United States Office Action dated Mar. 25, 2021 issued in co-pending related U.S. Appl. No. 16/666,979.
(Continued)

*Primary Examiner* — Karl E Group
*Assistant Examiner* — Cameron K Miller
(74) *Attorney, Agent, or Firm* — KED & Associates

(57) ABSTRACT

An enamel composition, a method for preparing an enamel composition, and a cooking appliance are provided. The enamel composition may include 15 to 50 wt % of phosphorus pentoxide ($P_2O_5$); 1 to 20 wt % of silicon dioxide ($SiO_2$); 1 to 20 wt % of boron oxide ($B_2O_3$); 5 to 20 wt % of one or more of lithium superoxide ($Li_2O$), sodium oxide ($Na_2O$), or potassium oxide ($K_2O$); 1 to 5 wt % of one or more of sodium fluoride (NaF), calcium fluoride ($CaF_2$), or aluminum fluoride ($AlF_3$); 1 to 35 wt % of one or more of magnesium oxide (MgO), barium oxide (BaO), or calcium oxide (CaO); and 5 to 30 wt % of one or more of titanium dioxide ($TiO_2$), vanadium pentoxide ($V_2O_5$), molybdenum trioxide ($MoO_3$), or iron oxide ($Fe_2O_3$). With such an enamel composition, cleaning may be performed at a low temperature for thermal decomposition, and contaminants, such as fat, may be more completely removed.

3 Claims, 3 Drawing Sheets

(51) Int. Cl.
  *C03C 8/16* (2006.01)
  *C03C 8/20* (2006.01)
  *C23D 5/02* (2006.01)
  *C23D 5/04* (2006.01)
  *F24C 15/00* (2006.01)

(52) U.S. Cl.
  CPC .............. *C23D 5/02* (2013.01); *C23D 5/04* (2013.01); *F24C 15/005* (2013.01); *C03C 2204/04* (2013.01); *C03C 2207/04* (2013.01)

(56) References Cited

U.S. PATENT DOCUMENTS

| | | |
|---|---|---|
| 3,718,498 A | 2/1973 | Denny et al. |
| 4,084,975 A | 4/1978 | Faust |
| 4,147,835 A | 4/1979 | Nishino et al. |
| 4,180,482 A | 12/1979 | Nishino et al. |
| 4,460,630 A | 7/1984 | Nishino et al. |
| 4,515,862 A | 5/1985 | Maki et al. |
| 4,877,758 A | 10/1989 | Lee et al. |
| 5,650,364 A | 7/1997 | Münstedt et al. |
| 5,747,395 A | 5/1998 | Smith et al. |
| 6,123,874 A | 9/2000 | Fukaya et al. |
| 6,321,569 B1 | 11/2001 | Sreeram et al. |
| 6,350,495 B1 | 2/2002 | Schriener et al. |
| 6,429,161 B1 | 8/2002 | Souchard et al. |
| 6,511,931 B1 | 1/2003 | Baldwin |
| 6,566,289 B2 | 5/2003 | Aronica et al. |
| 6,652,972 B1 | 11/2003 | Conzone et al. |
| 6,881,690 B2 | 4/2005 | Kawamura et al. |
| 6,924,246 B2 | 8/2005 | Kato et al. |
| 7,763,557 B2 | 7/2010 | Baldwin et al. |
| 8,815,347 B2 | 8/2014 | Shimoda et al. |
| 2003/0119647 A1 | 6/2003 | Sanichi et al. |
| 2003/0162646 A1 | 8/2003 | Kawamura et al. |
| 2003/0187118 A1 | 10/2003 | Aronica et al. |
| 2004/0043053 A1 | 3/2004 | Yu et al. |
| 2004/0069764 A1 | 4/2004 | Imai et al. |
| 2005/0014625 A1 | 1/2005 | Espargilliere et al. |
| 2005/0148722 A1 | 7/2005 | Aronica et al. |
| 2008/0044488 A1 | 2/2008 | Zimmer et al. |
| 2009/0311514 A1 | 12/2009 | Shon et al. |
| 2010/0009837 A1 | 1/2010 | Sakoske |
| 2010/0264126 A1 | 10/2010 | Baek et al. |
| 2011/0011423 A1 | 1/2011 | Baek et al. |
| 2011/0049122 A1 | 3/2011 | Baek et al. |
| 2011/0174826 A1 | 7/2011 | Le Bris et al. |
| 2011/0262758 A1 | 10/2011 | Benford, Jr. et al. |
| 2011/0277505 A1 | 11/2011 | Sakoske |
| 2013/0149444 A1 | 6/2013 | Le Bris et al. |
| 2013/0299482 A1 | 11/2013 | Kim et al. |
| 2013/0299484 A1 | 11/2013 | Lee et al. |
| 2015/0083109 A1 | 3/2015 | Baek et al. |
| 2018/0170797 A1* | 6/2018 | Gorecki .......... C03C 8/14 |
| 2018/0215654 A1 | 8/2018 | Choi et al. |
| 2018/0215655 A1 | 8/2018 | Kim et al. |
| 2019/0002336 A1 | 1/2019 | Kim et al. |
| 2019/0092680 A1 | 3/2019 | Kim et al. |
| 2019/0337837 A1 | 11/2019 | Kim et al. |
| 2020/0115274 A1 | 4/2020 | Awagakubo et al. |
| 2020/0148583 A1 | 5/2020 | Choi et al. |
| 2020/0270167 A1 | 8/2020 | Choi et al. |
| 2020/0270168 A1 | 8/2020 | Choi et al. |
| 2020/0270171 A1* | 8/2020 | Gwoo .......... A47J 36/04 |

FOREIGN PATENT DOCUMENTS

| | | |
|---|---|---|
| CN | 1042890 | 6/1990 |
| CN | 1105343 | 7/1995 |
| CN | 1108626 | 9/1995 |
| CN | 1176942 | 3/1998 |
| CN | 1487240 | 4/2004 |
| CN | 1892962 | 1/2007 |
| CN | 101067207 | 11/2007 |
| CN | 101094818 | 12/2007 |
| CN | 101182119 | 5/2008 |
| CN | 101519275 | 9/2009 |
| CN | 101519276 | 9/2009 |
| CN | 101734858 | 6/2010 |
| CN | 102066011 | 5/2011 |
| CN | 102086091 | 6/2011 |
| CN | 102089253 | 6/2011 |
| CN | 102219383 | 10/2011 |
| CN | 102368933 | 3/2012 |
| CN | 102369168 | 3/2012 |
| CN | 102422085 | 4/2012 |
| CN | 102517582 | 6/2012 |
| CN | 104891805 | 9/2015 |
| CN | 104891810 | 9/2015 |
| CN | 105621889 | 6/2016 |
| CN | 106957149 | 7/2017 |
| CN | 107513747 | 12/2017 |
| CN | 108059341 | 5/2018 |
| CN | 108675636 | 10/2018 |
| CN | 108863074 | 11/2018 |
| EP | 0 086 109 | 8/1983 |
| EP | 0 453 897 | 10/1991 |
| EP | 0 565 941 | 10/1993 |
| EP | 1 160 283 | 12/2001 |
| EP | 1 256 556 | 11/2002 |
| EP | 1 298 099 | 4/2003 |
| EP | 1 559 692 | 8/2005 |
| EP | 2 662 341 | 11/2013 |
| EP | 3 357 877 | 8/2018 |
| EP | 3 459 914 | 3/2019 |
| EP | 3 578 525 | 12/2019 |
| EP | 3 650 414 | 5/2020 |
| GB | 1 214 261 | 12/1970 |
| HU | 01 00796 | 8/2002 |
| JP | S54-77618 | 6/1979 |
| JP | S54-106529 | 8/1979 |
| JP | S54-153819 | 10/1979 |
| JP | S55-75740 | 6/1980 |
| JP | S56-78450 | 6/1981 |
| JP | S63-230537 | 9/1988 |
| JP | S63-230538 | 9/1988 |
| JP | 2001-080935 | 3/2001 |
| JP | 2001-303276 | 10/2001 |
| JP | 2002-367510 | 12/2002 |
| JP | 2003-206417 | 7/2003 |
| JP | 2004-269322 | 9/2004 |
| JP | 2004-358846 | 12/2004 |
| JP | 2005-008974 | 1/2005 |
| JP | 2014-148465 | 8/2014 |
| JP | 2014-221937 | 11/2014 |
| JP | 2016-030849 | 3/2016 |
| KR | 10-2011-0023079 | 3/2011 |
| KR | 10-2013-0125907 | 11/2013 |
| KR | 10-2013-0125910 | 11/2013 |
| KR | 10-2013-0125918 | 11/2013 |
| KR | 10-2014-0014658 | 2/2014 |
| KR | 10-2014-0115562 | 10/2014 |
| KR | 10-1476501 | 12/2014 |
| KR | 10-2018-0089986 | 8/2018 |
| KR | 10-2018-0089988 | 8/2018 |
| RU | 2007112383 | 10/2008 |
| WO | WO 95/09131 | 4/1995 |
| WO | WO 01/92413 | 12/2001 |
| WO | WO 02/02471 | 1/2002 |
| WO | WO 03/008354 | 1/2003 |
| WO | WO 2018/143704 | 8/2018 |
| WO | WO 2018/198986 | 11/2018 |
| WO | WO 2019/203565 | 10/2019 |

OTHER PUBLICATIONS

United States Office Action dated Apr. 6, 2021 issued in co-pending related U.S. Appl. No. 16/676,903.
Korean Office Action dated May 8, 2020 issued in KR Application No. 10-2019-0021139.
Korean Office Action dated May 11, 2020 issued in KR Application No. 10-2019-0021140.

(56) References Cited

OTHER PUBLICATIONS

Korean Office Action dated May 11, 2020 issued in KR Application No. 10-2019-0021141.
Korean Office Action dated May 12, 2020 issued in KR Application No. 10-2019-0021142.
Korean Office Action dated May 13, 2020 issued in KR Application No. 10-2019-0021143.
Korean Office Action dated May 13, 2020 issued in KR Application No. 10-2019-0021144.
Korean Office Action dated May 13, 2020 issued in KR Application No. 10-2019-0021145.
European Search Report dated Jun. 24, 2020 issued in EP Application No. 20158729.2.
European Search Report dated Jun. 24, 2020 issued in EP Application No. 20158736.7.
European Search Report dated Jun. 24, 2020 issued in EP Application No. 20158756.5.
European Search Report dated Jun. 29, 2020 issued in EP Application No. 20158751.6.
European Search Report dated Jul. 22, 2020 issued in EP Application No. 20158670.8.
European Search Report dated Jul. 22, 2020 issued in EP Application No. 20158683.1.
European Search Report dated Jul. 22, 2020 issued in EP Application No. 20158690.6.
Korean Notice of Allowance dated Jul. 27, 2020 issued in KR Application No. 10-2019-0021140.
Korean Notice of Allowance dated Jul. 27, 2020 issued in KR Application No. 10-2019-0021144.
Korean Notice of Allowance dated Jul. 27, 2020 issued in KR Application No. 10-2019-0021145.
Korean Notice of Allowance dated Jul. 29, 2020 issued in KR Application No. 10-2019-0021141.
Korean Notice of Allowance dated Jul. 30, 2020 issued in KR Application No. 10-2019-0021143.
European Search Report dated Mar. 24, 2020 issued in Application No. 19207979.6.
Korean Office Action dated Feb. 14, 2020 issued in Application No. 10-2018-0137475.
U.S. Appl. No. 16/666,979, filed Oct. 29, 2019.
U.S. Appl. No. 16/676,903, filed Nov. 7, 2019.
U.S. Appl. No. 16/795,923, filed Feb. 20, 2020.
U.S. Appl. No. 16/795,959, filed Feb. 20, 2020.
U.S. Appl. No. 16/796,052, filed Feb. 20, 2020.
U.S. Appl. No. 16/796,075, filed Feb. 20, 2020.
U.S. Appl. No. 16/796,102, filed Feb. 20, 2020.
U.S. Appl. No. 16/796,127, filed Feb. 20, 2020.
Korean Office Action dated Feb. 5, 2020 issued in Application No. 10-2018-0132225.
European Search Repot dated Mar. 24, 2020 issued in Application No. 19205924.4.
United States Notice of Allowance dated Nov. 23, 2021 issued in co-pending related U.S. Appl. No. 16/795,923.
Chinese Office Action dated Jul. 26, 2021 issued in CN Application No. 1911042287.3.
Chinese Office Action dated Jul. 27, 2021 issued in CN Application No. 202010107767.X.
Chinese Office Action dated Jul. 28, 2021 issued in CN Application No. 202010107396.5.
Chinese Office Action dated Jul. 28, 2021 issued in CN Application No. 202010107406.5.
Chinese Office Action dated Jul. 28, 2021 issued in CN Application No. 202010107479.4.
Chinese Office Action dated Jul. 28, 2021 issued in CN Application No. 202010107792.8.
Chinese Office Action dated Aug. 2, 2021 issued in CN Application No. 201911087064.9.
Chinese Office Action dated Aug. 2, 2021 issued in CN Application No. 202010107397.X.
Chinese Office Action dated Aug. 2, 2021 issued in CN Application No. 202010107499.1.
United States Office Action dated Apr. 4, 2022 issued in co-pending related U.S. Appl. No. 16/796,127.

* cited by examiner

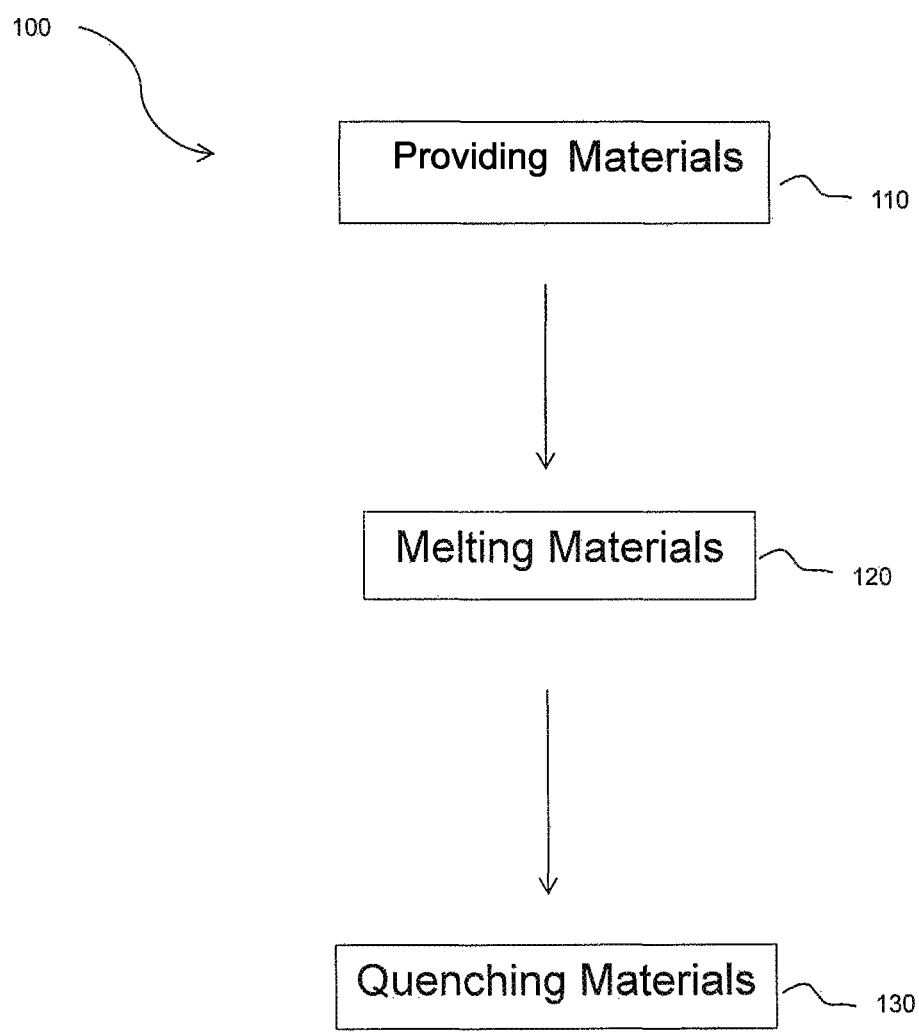

ENAMEL COMPOSITION, METHOD FOR PREPARING ENAMEL COMPOSITION, AND COOKING APPLIANCE

CROSS-REFERENCE TO RELATED APPLICATION(S)

This application claims priority to and the benefit of Korean Patent Application No. 10-2019-0021142, filed in Korea on Feb. 22, 2019, the disclosure of which is incorporated herein by reference in its entirety.

BACKGROUND

1. Field

An enamel composition, a method for preparing an enamel composition, and a cooking appliance are disclosed herein.

2. Background

Enamel is a substance where a glass glaze is applied onto a surface of a metallic plate. Ordinary enamel is used for cooking appliances, such as microwave ovens and ovens, for example. Cooking appliances, such as electric ovens and gas ovens, for example, are devices that cook food or other items (hereinafter, collectively "food") using a heat source. Contaminants, for example, produced during cooking, are attached to an inner wall of a cavity of a cooking appliance. Accordingly, the inner wall of the cavity needs to be cleaned. Enamel is coated on a surface of the inner wall of the cavity of the cooking appliance, for example, and helps remove contaminants attached to the cooking appliance easily. Among the technologies for readily cleaning the inner wall of a cavity, a process of pyrolysis (thermal decomposition) by which contaminants are burned to ashes at high temperatures is widely known. Enamel compositions including components, such as phosphorus pentoxide ($P_2O_5$), silicon dioxide ($SiO_2$), and boron oxide ($B_2O_3$), for example, are known as an enamel composition to which the process of pyrolysis can be applied.

However, in the case of the enamel composition widely known, temperatures for pyrolysis (thermal decomposition) are 450 to 500° C. When an enamel coating layer is heated for a long time at high temperatures, its durability may be decreased. Further, as the related art enamel composition has to be heated at high temperatures, a large amount of energy is spent on cleaning. Furthermore, in the case of the related art enamel composition, contaminants, such as fat including tallow, lard, and poultry fat, are not readily removed.

BRIEF DESCRIPTION OF THE DRAWINGS

Embodiments will be described in detail with reference to the following drawings in which like reference numerals refer to like elements, and wherein:

FIG. 4 is a flow chart of a method for preparing an enamel composition according to an embodiment.

DETAILED DESCRIPTION

Enamel Composition

Figure 1:
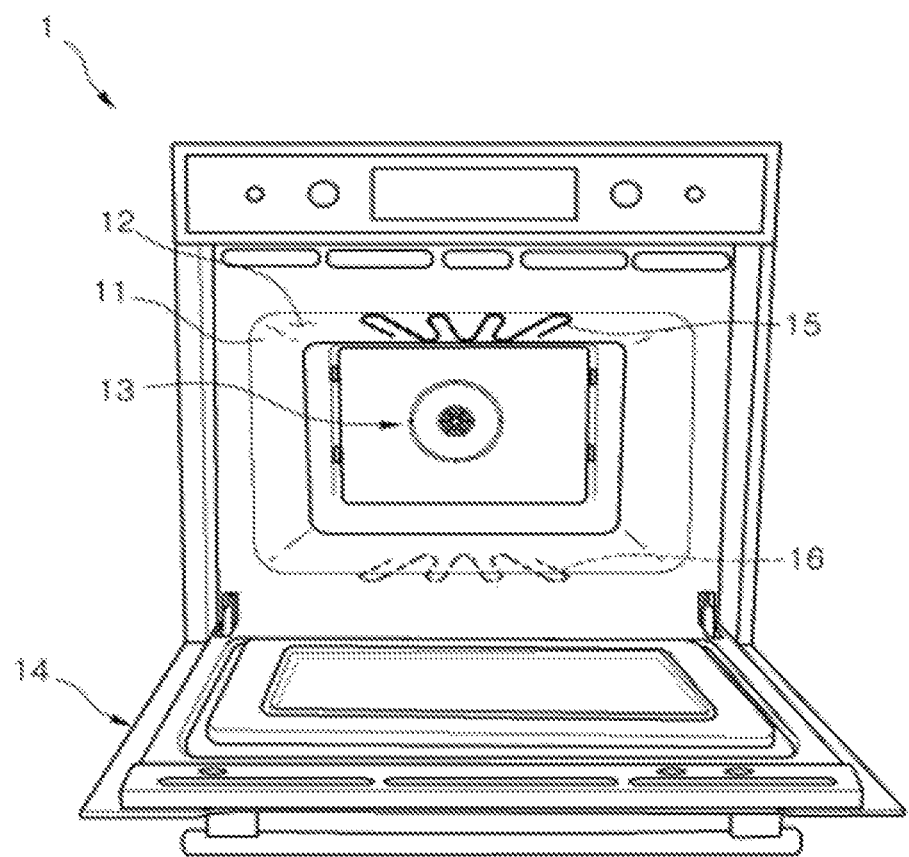
FIG. 1 is a front perspective view of a cooking appliance according to an embodiment.
Figure 2:
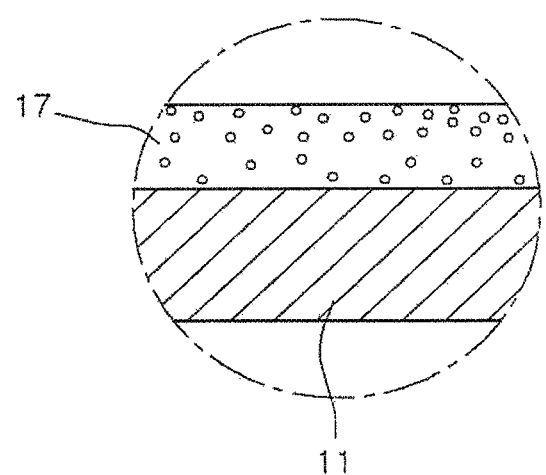
FIG. 2 is a partial enlarged cross-sectional view of a portion of an inner surface of a cavity of the cooking appliance in FIG. 1.

An enamel composition according to embodiments may include 15 to 50 wt % of phosphorus pentoxide ($P_2O_5$); 1-20 wt % of silicon dioxide ($SiO_2$); 1-20 wt % of boron oxide ($B_2O_3$); 5 to 20 wt % of one or more of lithium superoxide ($Li_2O$), sodium oxide ($Na_2O$), or potassium oxide ($K_2O$), 1 to 5 wt % of one or more of sodium fluoride (NaF), calcium fluoride ($CaF_2$), or aluminum fluoride ($AlF_3$), 1 to 35 wt % of one or more of magnesium oxide (MgO), barium oxide (BaO), or calcium oxide (CaO); and 5 to 30 wt % of one or more of titanium dioxide ($TiO_2$), vanadium pentoxide ($V_2O_5$), molybdenum trioxide ($MoO_3$) and iron oxide ($Fe_2O_3$).

$P_2O_5$ is a component that forms an alkali phosphate glass structure. $P_2O_5$ is also a glass former that helps addition of a large amount of transition metal oxides into an enamel composition, and helps water to permeate between an enamel surface and a contaminant, such that the contaminant is easily removed. $P_2O_5$ is contained in a range of 15 to 50 wt %. When more than 50 wt % of $P_2O_5$ is included, the enamel composition is hardly glazed, and thermal properties of the enamel composition may be deteriorated. Additionally, when less than 15 wt % of $P_2O_5$ is included, an amount of added transition metal oxides is reduced. Thus, a cleaning performance may be deteriorated.

$SiO_2$ is a component that forms a glass structure. $SiO_2$ reinforces a skeleton of the glass structure and enhances chemical resistance of the enamel composition. $SiO_2$ is contained in a range of 1 to 20 wt %. When more than 20 wt % of $SiO_2$ is included, the component interferes with the addition of transition metal oxides, thereby deteriorating a cleaning performance. When less than 1 wt % of $SiO_2$ is included, the glass composition may collapse.

$B_2O_3$ serves as a glass former and helps each component of the enamel composition to melt uniformly. $B_2O_3$ enhances coating performance by adjusting a coefficient of thermal expansion and fusion flow of the enamel composition. $B_2O_3$ may be contained in a range of 1 to 20 wt %. When more than 20 wt % of $B_2O_3$ is included, the component may interfere with the addition of transition metal oxides, thereby deteriorating a cleaning performance. When less than 1 wt % of $B_2O_3$ is included, the glass composition may collapse and crystallization of the glass composition may occur. $Li_2O$, $Na_2O$, and $K_2O$ improve a cleaning performance of an enamel composition. One or more of $Li_2O$, $Na_2O$, or $K_2O$ are contained in the enamel composition in a range of 5 to 20 wt %. When more than 20 wt % of the one or more of $Li_2O$, $Na_2O$, or $K_2O$ is included, the coefficient of thermal expansion of glass may be extremely increased. Accordingly, a coating performance may be deteriorated. When less than 5 wt % of the one or more of $Li_2O$, $Na_2O$, or $K_2O$ is included, a cleaning performance may be deteriorated.

NaF, $CaF_2$, and $AlF_3$ are components that control surface tension of an enamel coating layer and improve surface properties of the enamel coating layer. One or more of NaF, $CaF_2$, or $AlF_3$ are included in the enamel composition in a range of 1 to 5 wt %. When more than 5 wt % of the one or more of NaF, $CaF_2$, or $AlF_3$ is included, thermal properties may be deteriorated. When less than 1 wt % of the one or more of NaF, $CaF_2$, or $AlF_3$ is included, surface properties of the enamel coating layer may be deteriorated.

MgO, BaO, and CaO are components that improve adhesion between the enamel coating layer and a base metal plate. One or more of the MgO, BaO, or CaO are contained in the enamel composition in a range of 1 to 35 wt %. When more than 35 wt % of the one or more of MgO, BaO, or CaO is included, a cleaning performance may be deteriorated. When less than 1 wt % of the one or more of MgO, BaO, or CaO is included, adhesion between the enamel coating layer and the metal plate may be reduced. Thus, glass stability may be reduced.

$TiO_2$, $V_2O_5$, $MoO_3$, and $Fe_2O_3$ function as a catalyst on a surface of the enamel coating layer. Accordingly, $TiO_2$, $V_2O_5$, $MoO_3$ and $Fe_2O_3$ easily disconnect the surface of the enamel coating layer and the contaminant. One or more of $TiO_2$, $V_2O_5$, $MoO_3$, or $Fe_2O_3$ are included in a range of 5 to 30 wt %. When more than 30 wt % of the one or more of $TiO_2$, $V_2O_5$, $MoO_3$, or $Fe_2O_3$ is included, the enamel composition is hardly glazed and thermal properties of the enamel composition are deteriorated. When less than 5 wt % of one or more of $TiO_2$, $V_2O_5$, $MoO_3$, or $Fe_2O_3$ is included, a catalytic reaction on the surface of the enamel coating layer occurs less frequently. Accordingly, a cleaning performance may be deteriorated.

Next, the enamel composition may further include 1 to 20 wt % of aluminum oxide ($Al_2O_3$); 1 to 5 wt % of zirconium dioxide ($ZrO_2$); and 1 to 10 wt % of one or more of tin oxide (SnO) or zinc oxide (ZnO). The above-described components of $Al_2O_3$, $ZrO_2$, SnO, and ZnO may enhance durability of a weak alkali phosphate glass structure and may improve hardness of the enamel surface. When more than 20 wt % of $Al_2O_3$ is included, melting temperatures go up and fusion flow increase, thereby reducing adhesion of the enamel coating layer. When more than 5 wt % of $ZrO_2$ is included, or when more than 10 wt % of SnO and/or ZnO is included, a glass structure may not be formed. Additionally, when a content of each component is less than a minimum content thereof, durability of the enamel coating layer may be reduced.

The enamel composition may include 5 to 15 wt % of one or more of $MoO_3$ or $V_2O_5$, and may include 5 to 15 wt % of one or more of $MoO_3$ or $Fe_2O_3$, to maximize a cleaning performance while lowering a temperature for thermal decomposition. Mo and V and/or Mo and Fe perform the function of lowering the temperature of thermal decomposition for removing contaminants.

The enamel composition according to embodiments has a new composition ratio that is described above. Accordingly, with the enamel composition according to embodiments, contaminants may be cleaned in a range of temperatures of 350 to 380° C. which are 100° C. lower than temperatures at which contaminants are removed in the related art enamel composition. Thus, the enamel composition according to embodiments may ensure energy savings and reduce time spent on cleaning. Further, the enamel composition according to embodiments may ensure perfect cleaning of contaminants, such as fat, and may ensure easy hygiene management of a cooking appliance.

Method of Preparing Enamel Composition

The method 100 for preparing an enamel composition according to embodiments may include providing the above-described materials for the enamel composition (110); melting the materials (120); and quenching the melted materials (130) to form the enamel composition. The materials may be sufficiently mixed and then melted. The materials may be melted in a range of temperatures of 1200 to 1400° C. Additionally, the materials may be melted for one to two hours. Then, the melted materials may be rapidly cooled by a chiller, for example, such as a quenching roller.

Cooking Appliance

An enamel composition according to embodiments may be coated on a surface of a target object. The target object may be all or a portion of a metallic plate, a glass plate, or a cooking appliance, for example. The enamel composition may be coated on an inner surface of a cavity of a cooking appliance, or on an inner surface of a door of a cooking appliance, for example.

Referring to FIG. 1, a cooking appliance 1 according to an embodiment may include a cavity 11 in which a cooking chamber is formed, a door 14 that opens and closes the cooking chamber, at least one of heat sources 13, 15, 16 that supplies heat to the cooking chamber 11, and a coating layer formed by the enamel composition according to embodiments coated on an inner surface of the cavity 11 or an inner surface of the door 14. The cavity 11 may have a cuboid shape, a front surface of which is open. The heat sources 13, 15, 16 may include a convection assembly 13 that discharges heated air into the cavity 11, an upper heater 15 disposed at an upper portion of the cavity 11, and a lower heater 15 disposed at a lower portion of the cavity 11. The upper heater 15 and the lower heater 16 may be provided inside or outside of the cavity 11. The heat sources 13, 15, 16 may not include all of the convection assembly 13, the upper heater 15, and the lower heater 16. That is, the heat sources 13, 15, 16 may include any one or more of the convection assembly 13, the upper heater 15, and the lower heater 16.

Figure 3:
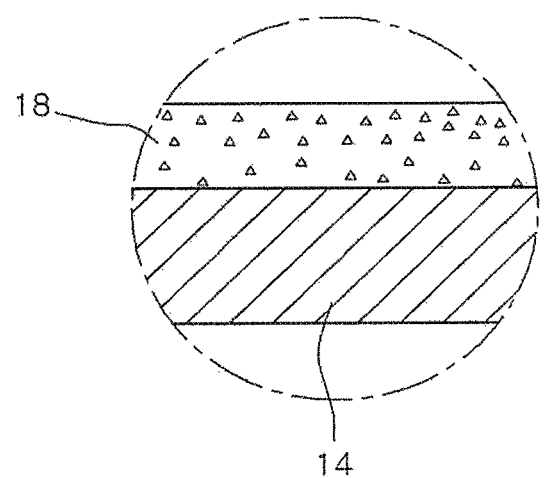
FIG. 3 is enlarged cross-sectional view of a portion of an inner surface of a door of the cooking appliance in FIG. 1.

Referring to FIGS. 3 and 4, the enamel composition according to embodiments may be coated on an inner surface of the cavity 11 of the cooking appliance 1 or on an inner surface of the door 14 of the cooking appliance 1 through a dry process or a wet process, for example. The cavity 11 and the door 14 may include a metallic plate. The coating layer 17, 18 using the enamel composition according to embodiments may be directly coated on the metallic plate in a single layer.

During the dry process, materials for the enamel composition may be dispersed in an organic binder, the mixed materials and organic binder may be milled in a ball mill, and a glass frit may be manufactured. During the wet process, materials for the enamel composition may be dispersed in water ($H_2O$) and pigment, the mixed materials, water ($H_2O$), and pigment may be milled in a ball mill, and a glass frit may be manufactured.

Then, the glass frit prepared according to the dry process or the wet process may be applied onto the inner surface of the cavity 11 of the cooking appliance 1 or onto the inner surface of the door 14 of the cooking appliance 1 through a spray process, for example. The applied glass frit may be calcinated for 100 to 450 seconds in a range of temperatures of 600 to 900° C., and may be coated on the inner surface of the cavity 11 or the inner surface of the door 14 of the cooking appliance 1.

Hereinafter, embodiments will be discussed with respect to examples.

Examples

Method for Preparation of Enamel Composition

An enamel composition having a composition ratio described in the following Table 1 was prepared. Raw materials of each component were sufficiently mixed for three hours in a V-mixer. ammonium dihydrogen phosphate ($NH_4H_2PO_4$) was used as a raw material for phosphorus pentoxide ($P_2O_5$), and sodium carbonate ($Na_2CO_3$), potassium carbonate ($K_2CO_3$), and lithium carbonate ($Li_2CO_3$) were, respectively, used as raw materials for $Na_2O$, $K_2O$, and $Li_2O$. The mixed materials were sufficiently melted for one and a half hours at 1300° C. and were rapidly cooled in a quenching roller. Then a glass cullet was obtained.

For producing frits (powder), initial granularity of the glass cullet obtained through the above-described processes was controlled with the ball mill, was ground for about five hours using a jet mill, and then passed through a 325 mesh sieve (ASTM C285-88) such that a particle diameter of the glass cullet was limited to 45 μm or less.

TABLE 1

| Component | Embodiment | | | | Comparative example | |
|---|---|---|---|---|---|---|
| (wt %) | 1 | 2 | 3 | 4 | 1 | 2 |
| $SiO_2$ | 14.44 | 15.01 | 15 | 12.87 | 0 | 32.1 |
| $P_2O_5$ | 24.8 | 25.58 | 22.54 | 21.94 | 47.66 | 0 |
| $B_2O_3$ | 9.08 | 10.83 | 14.03 | 9.29 | 0 | 0 |
| $Na_2O$ | 4.62 | 4.52 | 4.8 | 3.88 | 2.05 | 2.05 |
| $K_2O$ | 10.38 | 12.5 | 9.4 | 10.72 | 5.03 | 5.03 |
| $Li_2O$ | 0.88 | 0 | 0.45 | 0 | 0 | 0 |
| NaF | 0 | 1.72 | 0 | 1.47 | 0 | 12.1 |
| $CaF_2$ | 1.74 | 0 | 0 | 0 | 0 | 3.16 |
| $AlF_3$ | 0 | 0 | 1.2 | 0 | 0 | 0 |
| MgO | 0 | 0 | 0 | 0 | 7.99 | 7.99 |
| $Al_2O_3$ | 16.6 | 16.5 | 17.25 | 14.15 | 0 | 0 |
| CaO | 0 | 0 | 0 | 0 | 3.05 | 3.05 |
| $TiO_2$ | 3.52 | 1.41 | 2.88 | 1.21 | 2.05 | 2.35 |
| $V_2O_5$ | 0 | 9.35 | 0 | 9.1 | 10.4 | 10.4 |
| $Fe_2O_3$ | 0 | 0 | 2.52 | 0 | 0 | 0 |
| ZnO | 0 | 0 | 0 | 0 | 1.03 | 1.03 |
| $ZrO_2$ | 4.19 | 2.58 | 4.35 | 2.21 | 0 | 0 |
| $MoO_3$ | 8.86 | 0 | 5.58 | 13.16 | 0 | 0 |
| SnO | 0.89 | 0 | 0 | 0 | 0 | 0 |
| BaO | 0 | 0 | 0 | 0 | 20.74 | 20.74 |

Preparation of Sample of Enamel Composition

Next, the frits, which were manufactured using the enamel composition according to Embodiments 1 to 5, and Comparative Examples 1 to 2, were respectively sprayed onto a low carbon steel sheet having 200×200 mm and a thickness of 1 mm or less with a corona discharge gun. A voltage of the corona discharge gun was controlled under the conditions of 40 kV to 100 kV, and an amount of the frits sprayed on the low carbon steel sheet was 300 g/m². The low carbon steel sheet onto which the frits were sprayed was calcinated at temperatures of 830° C. to 870° C. for 300 to 450 seconds to form a coating layer on one surface of the low carbon steel sheet. In this case, the coating layer was formed to have thicknesses of about 80 μm to 250 μm. By doing so, the sample was prepared according to Embodiments 1 to 7, and Comparative Examples 1 to 3.

Experimental Example

Performance of the sample according to the above-described embodiments and comparative examples was evaluated as follows. Table 3 shows the results.

1. Cleaning Performance of Chicken Fat as Contaminant

One gram of chicken fat was thinly applied as a contaminant onto the surface of the sample, where a metallic substrate (100×100 (mm)) was coated with the enamel composition, with a brush evenly. Then the sample to which the contaminant was applied was put into a thermostat and the contaminant was fixed for an hour in a range of temperatures of 250 to 290° C. After the contaminant was fixed, the sample was cooled naturally and was burned for an hour at a temperature of 350° C. Then the hardened contaminant was cleaned with a kitchen scrubber for a frying pan, which was wet with room-temperature water, using a force of 3 kgf or less. Cleaned portions of the contaminated surface of the sample were uniformalized using a rod having a flat bottom and a diameter of 5 cm.

2. Cleaning Performance of Monster Mash

Cleaning performance of monster mash was evaluated using the same method as the above-described method. Frequency of back and forth cleaning motions made to the samples was measured and the frequency was defined as a frequency of back and forth cleaning motions. Table 2 shows indices of evaluation of cleaning performance.

TABLE 2

| Frequency of back and forth cleaning motions | Level |
|---|---|
| 1~5 | LV. 5 |
| 6~15 | LV. 4 |
| 16~25 | LV. 3 |
| 26~50 | LV. 2 |
| 51~ | LV. 1 |

TABLE 3

| | Embodiment | | | | Comparative example | |
|---|---|---|---|---|---|---|
| | 1 | 2 | 3 | 4 | 1 | 2 |
| Cleaning performance of chicken fat | LV.5 | LV.5 | LV.5 | LV.5 | LV.2 | LV.2 |
| Cleaning performance of monster mash | LV.5 | LV.4 | LV.5 | LV.4 | LV.1 | LV.1 |

As shown in FIG. 4, the embodiments had excellent cleaning performance. The comparative examples were less excellent in cleaning performance than the embodiments as the comparative examples had a composition less optimal than the composition of the embodiments.

Embodiments disclosed herein provide a new enamel composition that may have a cleaning temperature lower than the related art enamel composition. Embodiments disclosed herein also provide a new enamel composition where contaminants, such as fat, may be more completely removed.

To provide a new enamel composition having a heating temperature for thermal decomposition lower than the related art enamel composition and reduced energy consumption for cleaning, the enamel composition may include 15 to 50 wt % $P_2O_5$; 1 to 20 wt % $SiO_2$; 1 to 20 wt % $B_2O_3$; 5 to 20 wt % of one or more of $Li_2O$, $Na_2O$, or $K_2O$; 1 to 5 wt % of one or more of NaF, $CaF_2$, or $AlF_3$; 1 to 35 wt % of one or more of MgO, BaO, or CaO; and 5 to 30 wt % of one or more of $TiO_2$, $V_2O_5$, $MoO_3$, or $Fe_2O_3$. To provide a phosphate-based enamel composition where cleaning performance of contaminants, such as fat, may be maximized, the enamel composition may include 5 to 15 wt % of one or more of $MoO_3$ or $V_2O_5$, and 5 to 15 wt % of one or more of $MoO_3$ or $Fe_2O_3$.

The enamel composition may include a new phosphate-based glass composition, thereby making it possible to perform cleaning at a temperature which is approximately 100° C. lower than a temperature of the related art enamel composition. Thus, the enamel composition may ensure energy savings at the time of cleaning unlike the related art enamel composition.

The enamel composition where contaminants, such as fat, are more completely removed may ensure improved hygiene of a cooking appliance. The enamel composition may be directly coated on a base metal plate in a single layer with no intermediate buffer layer, thereby simplifying manufacturing.

The embodiments are described with reference to the embodiments illustrated in the drawings. However, the embodiments are not limited to the embodiments and the drawings set forth herein. Further, various modifications may be made by one having ordinary skill in the art within the scope of the technical spirit. Furthermore, though not explicitly described during description of the embodiments, effects and predictable effects according to the configuration of the disclosure should be included in the scope.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An enamel composition, comprising:
   15 to 50 wt % of phosphorus pentoxide ($P_2O_5$);
   1 to 20 wt % of silicon dioxide ($SiO_2$);
   1 to 20 wt % of boron oxide ($B_2O_3$);
   5 to 20 wt % of at least one of lithium superoxide ($Li_2O$), sodium oxide ($Na_2O$), or potassium oxide ($K_2O$);
   1 to 5 wt % of at least one of sodium fluoride (NaF), calcium fluoride ($CaF_2$), or aluminum fluoride ($AlF_3$);
   1 to 35 wt % of at least one of magnesium oxide (MgO), barium oxide (BaO), or calcium oxide (CaO);
   5 to 15 wt % of a sum of molybdenum trioxide ($MoO_3$) and vanadium pentoxide ($V_2O_5$) or a sum of $MoO_3$ and iron oxide ($Fe_2O_3$); and
   5 to 30 wt % of titanium dioxide ($TiO_2$).

2. The enamel composition of claim 1, further comprising:
   1 to 20 wt % of aluminum oxide ($Al_2O_3$);
   1 to 5 wt % of zirconium dioxide ($ZrO_2$); and
   1 to 10 wt % of at least one of tin oxide (SnO) or zinc oxide (ZnO).

3. A cooking appliance, comprising:
   a cavity in which a cooking chamber is formed;
   a door that opens and closes the cooking chamber;
   at least one of heat sources that supply heat for heating an object to be cooked in the cooking chamber; and a coating layer formed using the enamel composition of claim 1 coated on an inner surface of the cavity or an inner surface of the door.

\* \* \* \* \*